Figure 3:
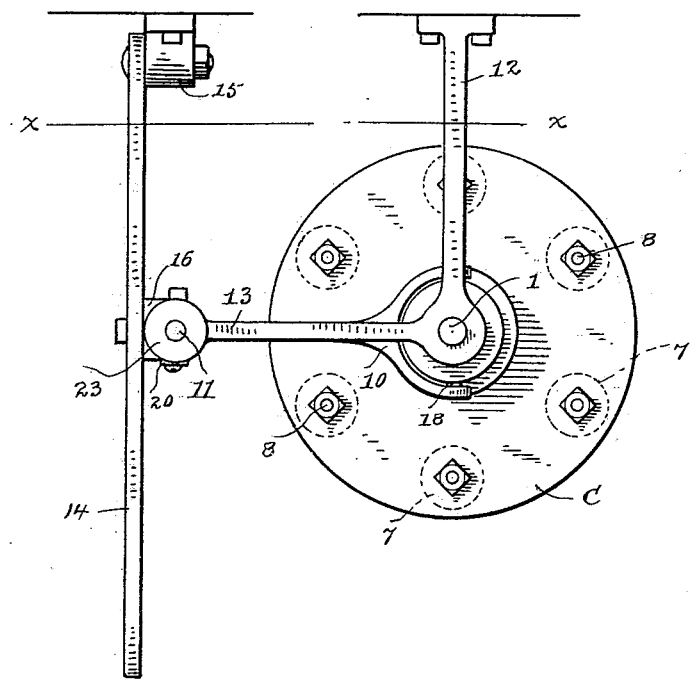

No. 623,381. Patented Apr. 18, 1899.
E. E. NORTON.
REVERSING MECHANISM.
(Application filed Nov. 21, 1898.)
(No Model.) 2 Sheets—Sheet 1.
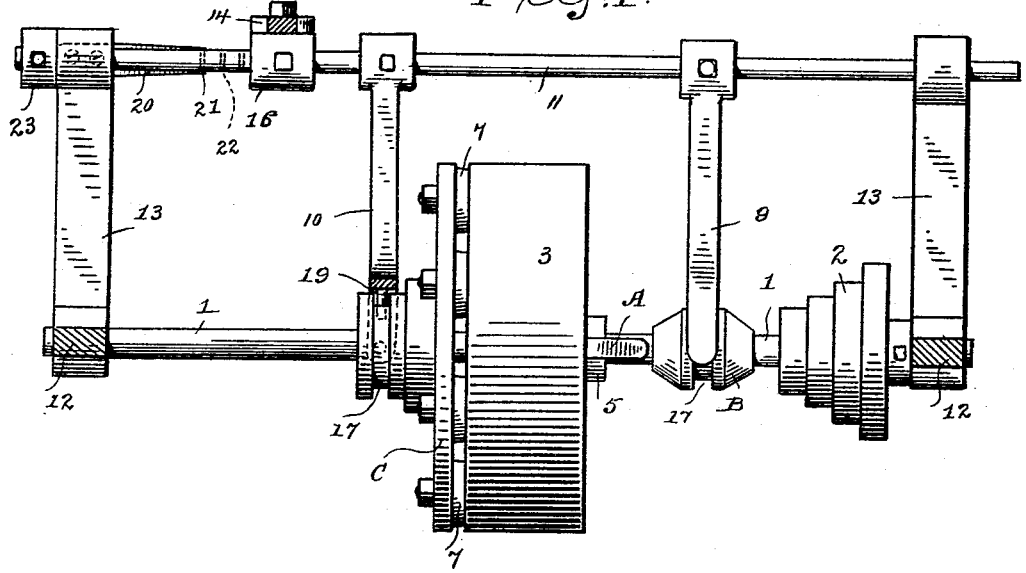
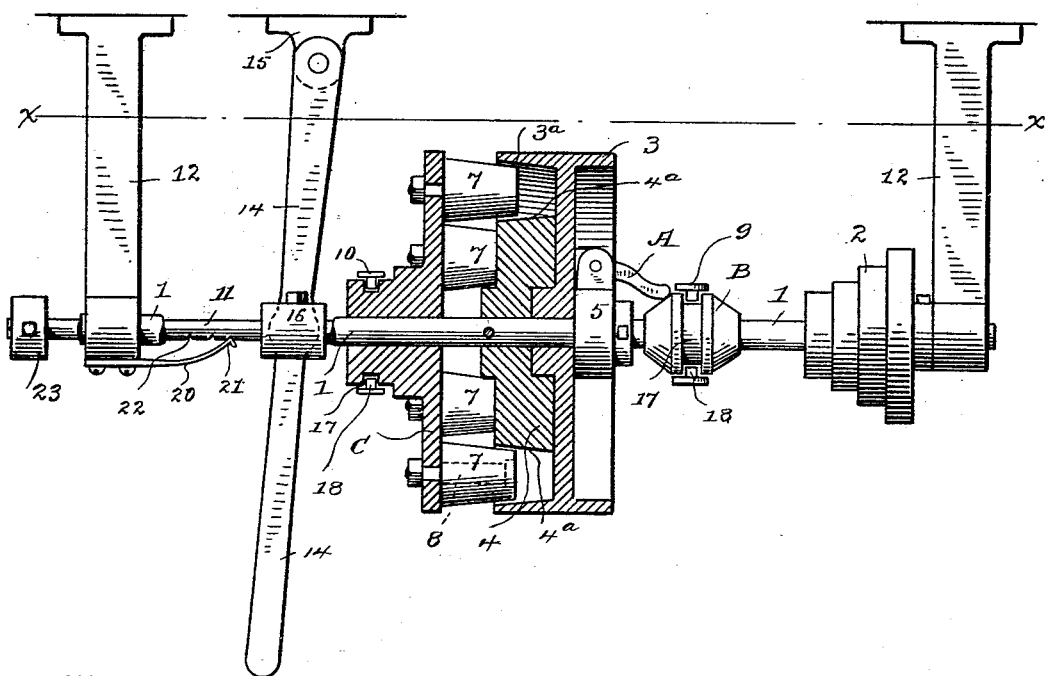
WITNESSES
INVENTOR
Eugene E. Norton No. 623,381. Patented Apr. 18, 1899.
E. E. NORTON.
REVERSING MECHANISM.
(Application filed Nov. 21, 1898.)

(No Model.) 2 Sheets—Sheet 2.

WITNESSES
H. H. Lamb
S. V. Hley

INVENTOR
Eugene E. Norton
By
A. M. Wooster
Atty.

UNITED STATES PATENT OFFICE.

EUGENE E. NORTON, OF BRIDGEPORT, CONNECTICUT.

REVERSING MECHANISM.

SPECIFICATION forming part of Letters Patent No. 623,381, dated April 18, 1899.

Application filed November 21, 1898. Serial No. 696,992. (No model.)

*To all whom it may concern:*

Be it known that I, EUGENE E. NORTON, a citizen of the United States, residing at Bridgeport, county of Fairfield, State of Connecticut, have invented a new and useful Reversing Mechanism, of which the following is a specification.

My invention relates to the type of reversing mechanism in which a single belt running continuously in the same direction is used to drive machinery in either direction, as may be required; and my invention has for its object to provide mechanism of this character which shall be simple and inexpensive to produce, durable and not likely to get out of repair, which will change the motion of machinery from one direction to the other without shock or jar, and in which the belt shall move continuously in one direction on a single pulley and without change of position of the belt, my invention being applicable to any of the ordinary machines and machine-tools—for example, to planers, shapers, screw-cutting machines, hoisting machinery, &c.

In order to accomplish the desired result in the simplest and most inexpensive manner possible, I have devised the novel reversing mechanism, which I will now describe, referring by reference characters to the accompanying drawings, forming part of this specification, in which—

Figure 4:
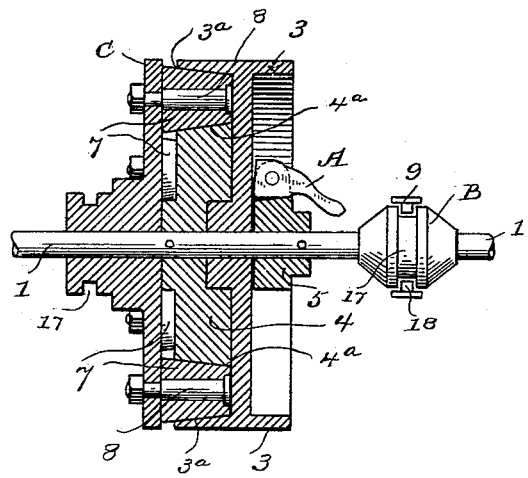

Figure 1 is a plan view of my novel reversing mechanism complete, the brackets and shifting-lever being in section on the line $xx$ in Fig. 2; Fig. 2, an elevation corresponding with Fig. 1, the essential parts of my novel reversing mechanism being in section; Fig. 3, an end elevation as seen from the left in Figs. 1 and 2; and Fig. 4 is a section of the operative parts of the device, showing the alternative position from that in Fig. 2—that is to say, the motion of the shaft being in the opposite direction.

1 denotes a shaft, and 2 pulleys on said shaft, by means of which motion is communicated to the machine or machines to be driven.

3 is a pulley mounted to turn on shaft 1, said pulley being driven continuously in one direction by means of a belt. (Not shown.)

4 denotes a disk rigidly secured to shaft 1, and 5 is a collar also rigidly secured to said shaft, which carries a suitable clutch, the function of which is to connect pulley 3 to the shaft. This clutch I have designated as a whole by A. The special form of clutch used, however, is not of the essence of my invention, it being simply necessary to connect the pulley to the shaft, but wholly immaterial by what style of clutch the connection is made or whether the entire clutch is carried by one of the parts to be connected or clutch members are carried by both of the parts to be connected.

B denotes a cone which is mounted loosely on shaft 1, so as to be free to be moved longitudinally thereon.

C denotes a disk which is mounted loosely on shaft 1, so that it is free to be moved longitudinally on said shaft, and is, moreover, held against rotation in any suitable manner, as will presently be explained, so that the shaft may turn freely within it at all times. This disk carries a series of rollers 7, which are journaled on studs 8, fixed in the disk. The rollers are shown as made tapering and are adapted to engage the inner face $3^a$ of the flanges of pulley 3 and the outer face $4^a$ of disk 4, said faces $3^a$ and $4^a$ being of course formed at a suitable incline to correspond with the tapering rollers carried by disk C, so that said rollers will engage both faces closely. These rollers in practice receive motion from pulley 3 and communicate motion in the reverse direction to disk 4, which carries the shaft and pulleys 2.

Cone B and disk C may be moved longitudinally on shaft 1 in any suitable manner. I have shown cone B as moved by an arm 9 and disk C as moved by an arm 10, both of said arms being rigidly secured to a sliding rod 11. It is of course wholly immaterial, so far as the principle of my invention is concerned, how shaft 1 and the sliding rod are supported. I have shown shaft 1 as journaled in brackets 12, which in the present instance depend from the ceiling and which are provided with laterally-extending arms 13, in which rod 11 is mounted to slide freely. I have shown rod 11 in the present instance as adapted to be reciprocated to shift arms 13 and the cone and disk C by means of a shifting-lever 14, pivoted in the present instance to a hub 15 on the ceiling and to a hub 16, which is rigidly secured to the sliding rod, so that movement of the shifting-lever in either direction will carry the rod and with it arms 9 and 10 and the cone and disk C. The cone and the hub of disk C are each provided with a groove 17, and the ends of arms 9 and 10 are bifurcated, forming yokes, which carry pins 18 to engage grooves 17. The cone and disk C are both mounted loosely on the shaft and are free to be moved longitudinally thereon, the shaft being free to rotate independently of either. In practice I retain the disk against rotary movement in any suitable manner, as by means of a pin 19, which locks the hub of the disk to the yoke or bifurcated end of arm 10. (See Fig. 1.)

The operation will be clearly understood from Figs. 2 and 4 in connection with the other figures of the drawings. When it is desired to turn shaft 1 and the belt-pulley in one direction, the shifting-lever is moved toward the left, as seen in Fig. 2, thereby moving cone B toward the left and causing clutch A to lock pulley 3 to the shaft, so that the movement of pulley 3 will be communicated to the shaft. In order to lock the parts in this position, so that there will be no danger that the clutch will slip so as to disconnect the pulley from the shaft in use, I provide a spring 20, which is secured in the present instance to one of the arms 13 and is provided with a projection 21, which is adapted to engage one of the notches 22 in rod 11, in the present instance the notch farthest to the right, as seen in Fig. 2. Should it be desired to reverse the motion of shaft 1, and consequently of any machine or machines that may be driven therefrom, the operator by means of the shifting-lever moves rod 11 toward the right and changes the cone and disk C from the position shown in Fig. 2 to the position shown in Figs. 1 and 4, thereby operating clutch A to disconnect the pulley from the shaft, and an instant later placing the tapering rollers 7 on disk C in engagement with the inner face $3^a$ of the flange of pulley 3 and with the outer face $4^a$ of disk 4, which is rigidly secured to the shaft. The instant this engagement of rollers 7 with faces $3^a$ and $4^a$ takes place the movement of pulley 1 will be communicated to the rollers, and thence to disk 4 upon the shaft, so that the shaft will be driven in the opposite direction from the pulley. In this position of the parts projection 21 on spring 20 will be in engagement with the left notch 22 in rod 11, as indicated at the left in Fig. 1. Should it be desired to stop the motion of the shaft entirely, the operator simply moves the shifting-lever far enough in the proper direction to place projection 21 in engagement with the intermediate notch in rod 11. In this position of the parts (not shown in the drawings) cone B will not have been moved far enough toward the left to operate clutch $a$ and connect the pulley with the shaft, but rollers 7 will have been moved far enough toward the left to entirely disengage said rollers from faces $3^a$ and $4^a$, and thereby disconnect disk 4 from the pulley, so that the shaft and the machine or machines driven therefrom will remain stationary, the pulley, however, continuing to rotate as before.

The disk C is supported solely by the shaft 1 and is mounted to reciprocate thereon, as hereinbefore described. This construction enables a circular series of rollers 7 to be employed, said series being secured to the disk on the line of a circle concentric with the shaft 1. The said rollers, being tapering, may be withdrawn from the space between the surfaces $3^a$ and $4^a$ to a slight degree only. It is not necessary to move the disk to such an extent as to entirely withdraw the rollers, for the reason that as the said rollers are rigidly supported by the disk and the disk is supported and guided by the shaft the rollers cannot get out of position, so as to come in contact with either of the surfaces $3^a$ $4^a$ when the disk C has been withdrawn from the disk 4 to the slight degree necessary to remove the rollers 7 from contact with the said surfaces $3^a$ $4^a$.

Having thus described my invention, I claim—

1. A reversing mechanism comprising a shaft having a disk rigidly secured thereto and provided with a conical periphery, a pulley mounted to turn on said shaft and having an internal conical flange, a clutch for connecting the pulley with the shaft so that the pulley will carry the shaft in the direction in which it is moving, a disk directly supported by said shaft and movable longitudinally thereof and having a circular series of conical rollers rigidly supported thereby and adapted to engage the periphery of the first-mentioned disk and the internal surface of the said flange, and means for moving the roller-carrying disk reciprocally on said shaft.

2. In combination a shaft, having a disk 4 rigidly secured thereto, a pulley mounted to turn on said shaft and driven continuously in one direction, a clutch for connecting the pulley with the shaft so that the pulley will carry the shaft in the direction it is moving, a disk C mounted on and supported by the shaft and held against rotation leaving the shaft free to turn and a circular series of rollers carried by disk C and rigidly supported thereby and adapted to simultaneously engage the periphery of disk 4 and the inner face of the pulley so that when said parts are in engagement the pulley will drive the rollers which in turn will drive disk 4 and the shaft in the opposite direction from which the pulley is moving.

3. The combination with a shaft having a disk 4 rigidly secured thereto, a pulley mounted to turn thereon, and a disk C mounted on and supported by said shaft and held against rotation leaving the shaft free to turn, of a circular series of rollers carried by disk C and rigidly supported thereby and adapted to engage the inner face of the pulley and the periphery of disk 4 simultaneously, a clutch for connecting the pulley directly to the shaft, a cone mounted loosely on the shaft by which the clutch is operated, rod 11, arms rigidly secured to said rod and engaging the cone and disk C and means for moving said rod whereby the pulley may be caused to drive the shaft in either direction or may be wholly disconnected therefrom.

4. The combination with a shaft, a pulley loose thereon, a disk 4 fixed to the shaft and a disk C mounted on and supported by the shaft and adapted to be moved longitudinally on said shaft but held against rotation leaving the shaft free to turn, of a clutch adapted to connect the pulley directly to the shaft, circular series of rollers carried by disk C and rigidly supported thereby and adapted to engage the periphery of disk 4 and the flange of the pulley, and means for operating the clutch and for moving disk C on the shaft simultaneously whereby when the pulley is connected to the shaft the latter will be carried in the direction the pulley is moving, when disk C is in operative position the shaft will be carried in the opposite direction from which the pulley is moving and when both the clutch and disk C are out of operative position the pulley will move without carrying the shaft.

5. The combination with a shaft, a pulley loose thereon, a disk 4 fixed to the shaft and a disk C operating as described, of a clutch adapted to connect the pulley directly to the shaft, rollers carried by disk C and adapted to engage the periphery of disk 4 and the flange of the pulley, movable rod 11 having notches 22, a spring 20 having catch 21 to engage either of said notches, and arms extending from said rod and acting to operate the clutch and disk C simultaneously.

In testimony whereof I affix my signature in presence of two witnesses.

EUGENE E. NORTON.

Witnesses:
A. M. WOOSTER,
S. V. HELEY.